Dec. 16, 1969       H. J. WEBER ET AL       3,484,727
TAPPED TRANSFORMER WINDING HAVING HIGH
SHORT CIRCUIT STRENGTH
Filed Oct. 26, 1967

Inventors
Hans J. Weber
William H. Mutschler
By Lee N. Kaiser
Attorneys

United States Patent Office 3,484,727
Patented Dec. 16, 1969

3,484,727
TAPPED TRANSFORMER WINDING HAVING HIGH SHORT CIRCUIT STRENGTH
Hans J. Weber, Pittsburgh, Pa., and William H. Mutschler, Scituate, Mass., assignors to Allis-Chalmers Manufacturing Company, Milwaukee, Wis.
Filed Oct. 26, 1967, Ser. No. 678,358
Int. Cl. H01f 21/02, 21/12
U.S. Cl. 336—147   15 Claims

ABSTRACT OF THE DISCLOSURE

An electrical transformer coil has a tubular low voltage winding wound from conductor strip extending the entire axial length of the coil and a tapped, tubular high voltage winding concentric with the coil and a main section disposed between the tap sections energized in all tap changer positions, whereby the axial mechanical forces resulting from radial leakage flux are exerted on the high voltage winding in a direction to place it under compression even when a tap section is inactive and thus eliminate the need for external bracing. Preferably the tap sections are at the electrical center of the high voltage winding, the start and finish line leads to the high voltage are adjacent the physical center of the coil in the axial direction, and the high voltage winding comprises a plurality of axially spaced, one-turn-per-layer disk coils of wide conductor strip.

---

This invention relates to electrical induction apparatus such as transformers and in particular to electrical transformers provided with tap changers for varying the voltage ratio between primary and secondary windings.

When an electrical transformer is loaded, the current on the secondary winding flows around the magnetic core in a direction opposite to the current on the primary winding with the result that the primary and secondary windings repel each other. The mechanical forces between two current carrying conductors are proportional to the product of the currents carried by each and inversely as their distance apart. These forces between transformer primary and secondary windings are relatively small under normal conditions, but under short circuit conditions the forces may be very high. For example, if 25 times full-load current flows in each winding of a transformer on short circuit, the mechanical forces are equal to 25 squared or 625 times normal stresses. The trend in the industry is toward lower reactance transformers such as two percent impedance transformers which must be capable of withstanding 50 times normal load current, and inasmuch as the mechanical forces are theoretically proportional to the square of the load current, the transformer windings must either have bracing against axial forces of increased strength or the magitude of the mechanical forces on the windings must be decreased.

If the high voltage and low voltage coils are symmetrically arranged so their electrical centers are the same, the forces will be balanced. The electrical center of a winding of a symmetrical coil may be the same as the physical center of the coil. However, if a winding is provided with tap sections which are inserted or removed from the circuit by operation of a tap changer, the electrical center can coincide with the physical center only when the movable contact of the tape changer is in the "neutral" position wherein 100 percent of the tapped winding is in the circuit. When the tap changer is actuated to a tap different than the 100 percent "neutral" position, the electrical center of the tapped coil will no longer be at the physical center of the coil, and consequently the mechanical axial forces between the tapped winding and the other winding will be very high under short circuit conditions.

In transformers having concentric layers of helically wound wire, the taps are usually provided in the high voltage, or primary winding because of the relatively smaller magnitude of current that it carries, and the start and finish line leads are usually positioned at the ends of the primary winding and the tap sections are located near the phyiscal center of the winding to provide wide separation between the line leads and tap sections with consequent high breakdown strength under impulse conditions. When all of the tap sections at the center of the primary winding are connected in the circuit, the axial component of the mechanical forces resulting from the radial leakage flux is directed against opposite ends of the winding in a direction to place the primary winding under compression, and the resultant of the external forces on the winding is small. However, if one or more tap sections near the middle of the winding are removed by change of tap changer switch position, the leakage flux field is distorted and the axial forces resulting from the leakage flux are exerted against the active portions of the winding disposed at the ends of the winding in a direction to place the primary winding under tension, and external bracing is required to prevent telescoping of the high and low voltage coils under short circuit conditions.

Transformer primary windings are known having a plurality of axially spaced, one-turn-per-layer disk coils wound of conductor strip having a width in the axial direction substantially greater than its thickness in the radial direction as disclosed in the copending application of Joseph R. Benko and Hans J. Weber, Ser. No. 675,684 entitled Conductor Strip Transformer Winding Having Improved Short Circuit Strength, filed Oct. 16, 1967 and having the same assignee as the present invention. The short circuit strength of such conductor strip primary winding is inferior to that of a primary winding having wire turns, and particularly with low impedance transformers wherein the short circuit current can be up to 50 times rated current it is necessary to either substantially increase the strength of the external bracing means at the axial ends of the core or to decrease the magnitude of the short circuit forces.

It is an object of the invention to provide a tapped transformer winding having high impulse strength and wherein the short circuit forces are considerably less than in prior art transformers.

It is a further object of the invention to provide a transformer winding constructed of wide strip conductor which can successfully withstand short circuit currents of 50 times rated current without damage.

Another object is to provide an improved transformer primary winding construction provided with taps wherein the mechanical forces tending to telescope the primary and secondary windings are theoretically zero even when tap sections are inactive.

These and other objects and advantages of the invention will be more readily apparent from the following detailed description when considered in conjunction with the accompanying drawing wherein.

Figure 1:
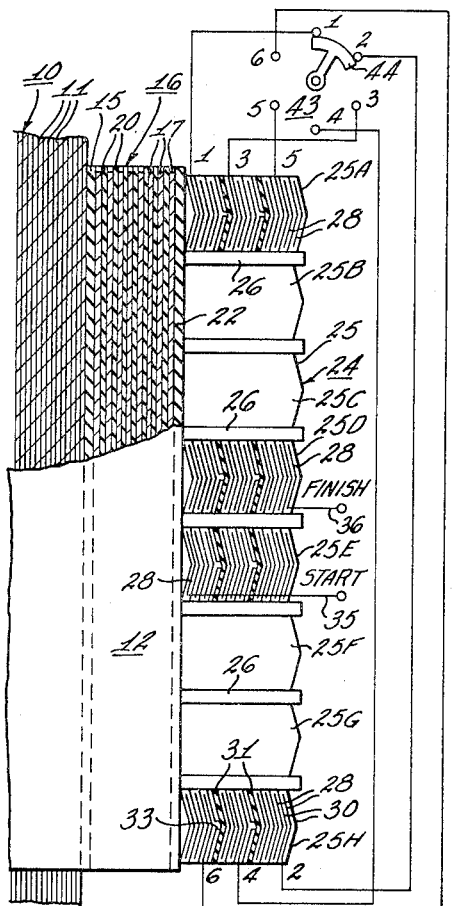
FIG. 1 is a partial sectional view through a transformer embodying the invention and schematically illustrating the tap changer and the leads between the tap changer stationary contacts and the tap sections.
Figure 2:
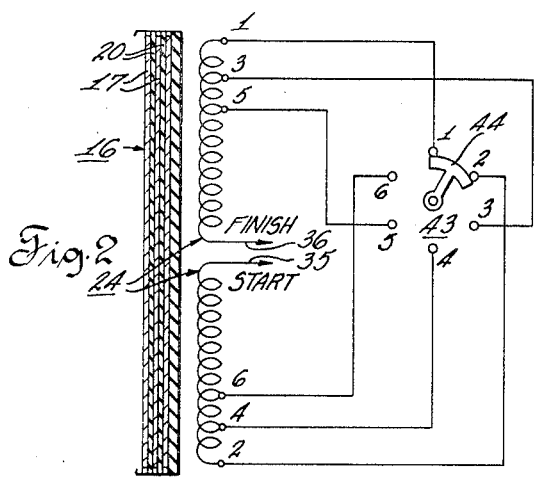
FIG. 2 is a schematic circuit diagram of the embodiment of FIG. 1.

Referring to FIGS. 1 and 2 of the drawing, the winding leg 10 of the magnetic core of an electrical distribution transformer is constructed of a plurality of magnetic steel laminations 11 and is surrounded by a cylindrical transformer coil 12 including an insulating support tube 15 circumjacent winding leg 10 upon which a low voltage transformer secondary winding 16 is wound comprising a plurality of aluminum strip or copper strip turns 17 having a width equal to the axial length of the transformer coil and separated by turns of sheet interlayer insulation 20. In alternative embodiments the interlayer insulation 20 may be omitted and a suitable insulating coating (not shown) such as an epoxy or an acrylic resin provided on the conductor strip, and further several axially spaced conductor strips may be wound in each layer instead of the single strip 17 extending the entire axial length of the coil 16. A tubular barrier 22 of suitable insulating material surrounds secondary winding 16 and separates it from a high voltage winding 24 comprising a plurality of axially spaced, one-turn-per layer disk coils 25 separated by radial spacers 26 and wound from aluminum or copper conductor strip 28 having a width in the axial direction considerably greater than its thickness in the radial direction, for example, 0.010 inch thick aluminum strip three inches wide. The conductor strip turns 28 are preferably of such cross section that adjacent turns interlock to prevent axial movement as disclosed in the aforementioned Benko and Weber application, and preferably the conductor strip 28 has a longitudinal depression, for example, is of V-shaped cross section. The conductor strip turns 28 may have a coating (not shown) of suitable insulation such as an epoxy resin or an acrylic resin, or, as shown in FIG. 1, turns of flexible strip insulation such as paper 30 may be wound between conductor strip turns 28. The conductor strip turns 28 are wound with sufficient tension to bend the flexible strip insulation 30 in conformity with the V-shaped cross section of the conductor strip 28, and suitable anchoring means (not shown) are provided at the inner and outer turns of each disk coil 25 to hold the conductor strip turns in interlocking relation. In certain embodiments the insulation strip turns 30 may extend axially beyond the conductor strip turns 28 to provide high dielectric strength in an axial direction, and corrugated support members 31 of suitable insultating material such as vulcanized fiber may be provided at radially spaced positions between the conductor turns 28 of each disk coil 25 to provide cooling ducts in an axial direction for transformer oil in which the transformer is immersed. The corrugated support member 31 may have a longitudinal saw cut 33 midway of its width extending partially through the thickness thereof so that the support members 31 may be bent in conformity with the V-shaped cross section of the conductor turns 28. The support members 31 having saw cut 33 therein, when held between tensioned conductor strip turns 28, abut against the radial spacers 26 on both sides of each disk coil 25 and provide high mechanical strength in an axial direction tending to prevent crushing of the edges of the paper insulation turns 30 and also preventing movement of the conductor strip turns 28 in an axial direction under short circuit forces.

All of the disk coils 25A–25H are shown in FIG. 1 as being wound from the inside out so that the magnetic flux generated by all of the disk coils is in the same direction, and the start line lead 35 of the primary winding 24 is shown connected to the inner conductor strip turn 28 of a disk coil 25E adjacent the physical center of the axial length of the transformer coil 12 and the finish line lead 36 is shown connected to the outer conductor strip turn 28 of an adjacent disk coil 25D also located near the physical center of the axial length of the transformer coil 12. The tap sections 1–3, 3–5, 2–4 and 4–6 are preferably located at the electrical center but at the physical ends of the primary winding 24, and the tap section 1–3 having tap leads connected to stationary contacts 1 and 3 of tap changer switch 43 may comprise conductor strip turns 28 on the radially inner portion of disk coil 25A disposed at one axial end of the transformer winding; tap section 2–4 having tap leads connected to stationary contacts 2 and 4 of tap changer 43 may comprise conductor strip turns 28 on the radially outer portion of disk coil 25H disposed at the opposite axial end of the transformer winding; tap section 3–5 having tap leads connected to stationary contacts 3 and 5 may comprise conductor strip turns 28 in the middle of disk coil 25A; and tap section 4–6 having tap leads connected to stationary contacts 4 and 6 of tap changer 43 may comprise conductor strip turns 28 adjacent the middle of disk coil 25H. It will be appreciated that the tap leads to stationary contacts 1–6 electrically connect the conductor strip turns 28 in disk coil 25A at one end of the transformer winding to the conductor strip turns 28 in disk coil 25H at the other end of the transformer winding, when movable contact 44 of tap changer 43 bridges an adjacent pair of stationary contacts, and electrically connect all of the disk coils 25A–25H in series so that the tap sections are at the electrical center but the physical ends of the transformer. All of the conductor strip turns in all of the disk coils 25A–25H are active and the voltage ratio is a maximum when movable contact 44 bridges stationary contacts 1 and 2. Tap section 1-3 is removed from the circuit and deenergized when movable contact 44 bridges stationary contacts 2 and 3. Tap sections 1–3 and 3–5 are removed from the circuit and inactive when movable contact 44 bridges stationary contacts 3 and 4, and all of the tap sections are inactive and the voltage ratio is a minimum when movable contact 44 bridges stationary contacts 5 and 6.

Preferably secondary winding 16 is longer in an axial direction than primary winding 24 and is mechanically strong since it is constructed of conductor strip 17 having a width equal to the axial length of the winding 16. When all of the tap sections are active, the axial mechanical forces resulting from the radial leakage flux are exerted against opposite ends of the primary winding 24 in a direction to place the primary winding 24 under compression, and this is also true when the tap changer is actuated to inactivate one or more tap sections. One may consider the structure of the invention to be analogous to a C-clamp wherein the mechanically strong and axially longer secondary winding 16 constitutes the clamp and the mechanical forces tending to compress the primary winding 24 react against the ends of the secondary winding 16. Even when a tap section such as 1–3 is inactive at one end of the primary winding 24 and both tap sections 2–4 and 4–6 at the other end of the primary winding 24 are in the circuit, the electromechanical forces resulting from the radial leakage flux are still in a direction to place the entire primary winding 24 under compression and no external braces are required for the high voltage winding 24.

Figure 3:
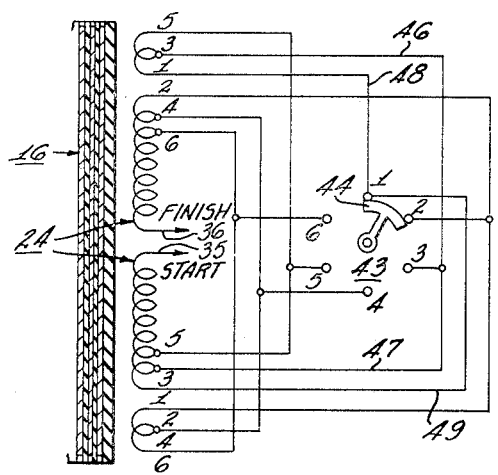
FIGS. 3 through 5 are schematic circuit diagrams illustrating alternative embodiments of the invention.

In the embodiment of FIG. 3, the primary winding start and finish line leads 35 and 36 respectively are connected to strip conductor turns 28 adjacent the physical center of primary winding 24, four tap sections 1–3, 2–4, 3–5 and 4–6 are provided at both ends of primary winding 24, and the corresponding tap sections are connected in parallel. The corresponding taps at both ends of the primary winding 24 are electrically commoned and connected to the corresponding stationary contact on tap changer 43 to connect the corresponding tap sections in parallel, for example, tap 3 on the upper end of winding 24 (as shown in the drawing) is connected by a lead 46 to tap changer stationary contact 3, and tap 3 at the lower end of winding 24 is connected by lead 47 to stationary contact 3. Similarly, tap 1 at the upper end of winding 24 is connected by lead 48 to stationary contact 1, and tap 1 at the lower end of winding 24 is connected by lead 49 to tap changer stationary contact 1, thereby connecting the two tap sections 1–3 at opposite ends of primary winding 24 in parallel. In this embodiment similar tap sections are connected into the circuit, or inactivated, at both ends of the winding 24 when a tap change is made so that both ends of primary winding 24 are symmetrical and the axial mechanical forces on winding 24 are always balanced regardless of the position of tap changer 43. For example, when tap changer movable contact 44 is moved from the highest voltage ratio position, wherein it bridges stationary contacts 1 and 2, to the position wherein it bridges stationary contacts 2 and 3, the tap sections 1–3 at both ends of the winding 24 are made inactive.

Figures 4, 5:
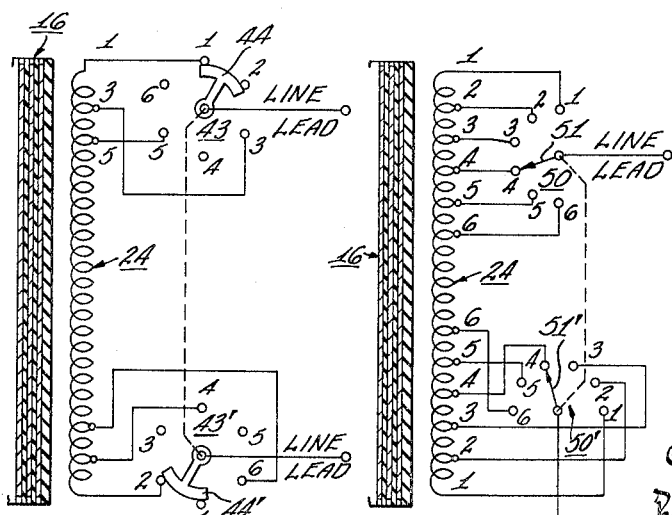

The embodiment of FIG. 4 is particularly suitable for transformers of low voltage rating and is similar to that of FIGS. 1 and 2 to the extent that tap sections 1–3 and 3–5 are at one physical end of primary winding 24 and tap sections 2–4 and 4–6 are at the opposite physical end thereof, but it differs in that two mechanically ganged tap changers 43 and 43′ are utilized and the line leads are electrically connected respectively to the movable contacts 44 and 44′ of the tap changers 43 and 43′ rather than to conductor strip turns adjacent the electrical center of the winding 24. Taps 1, 3 and 5 on tap sections 1–3 and 3–5 are connected to the corresponding stationary contacts of tap changer 43, and taps 2, 4 and 6 on tap sections 2–4 and 4–6 are connected to the corresponding stationary contacts of tap changer 43′. Tap sections at opposite ends of winding 24 are alternately switched as tap changers 43 and 43′ are simultaneously actuated, for example, actuating both tap changers from the highest voltage ratio position, wherein movable contacts 44 and 44′ bridge stationary contacts 1 and 2, to the position wherein they bridge stationary contacts 2 and 3 inactivates tap section 1–3 at the upper end of winding 24. Further, simultaneous actuation of both tap changers from this latter position to the tap position wherein both movable contacts 44 and 44′ bridge stationary contacts 3 and 4 of the tap changers 43 and 43′ respectively inactivates tap section 2–4 at the lower end of winding 24. In this embodiment the axial mechanical forces resulting from the radial leakage flux exerted on opposite ends of winding 24 are unbalanced in tap positions wherein the stationary contacts 2–3 and 4–5 are bridged by the movable contacts 44 and 44′, but such forces are still in a direction to compress winding 24, and consequently no external bracing is required.

The embodiment of FIG. 5 is similar to that of FIG. 3 to the extent that four tap sections 1–3, 2–4, 3–5 and 4–6 are provided at both the upper and at lower end of the winding 24 and that the axial mechanical forces on winding 24 are always balanced regardless of the tap changer position, but the embodiment differs from that of FIG. 3 in that two mechanically ganged switches 50 and 50′ are provided having nonbridging movable contacts 51 and 51′ connected respectively to the line leads and stationary contact 1–6 connected to corresponding taps at the upper and lower ends of primary winding 24. In this embodiment one tap section at each end of primary winding 24 is switched at each tap change and the axial forces are always balanced regardless of the tap position. For example, when both movable contacts 51 and 51′ are simultaneously moved from the highest voltage ratio position, wherein they engage stationary contacts 1, to the position wherein they engage stationary contacts 2, the tap sections 1–2 at the upper and at the lower end of primary winding 24 are deenergized and removed from the circuit.

The preferred embodiment of the invention is illustrated and described as having a plurality of one-turn-per-layer disk coils constructed of wide strip conductor, but the invention is applicable to any type of primary winding such as a helical coil constructed of concentric layers of wire turns and also disk coils having more than one turn per layer. Further, the invention is described as embodied in a high voltage winding, but the invention is also applicable to a tapped secondary winding. While only a few embodiments of the invention are illustrated and described, many modifications and variations thereof will be readily apparent to those skilled in the art, and consequently it is intended in the appended claims to cover all such modifications and variations which are within the true spirit and scope of the invention.

The embodiments of the invention in which an exclusive property or privilege is claimed are defined as follows:

1. In an electrical transformer having a tap changer switch for changing the transformer voltage ratio, a transformer coil including a tubular low voltage winding wound from conductor strip having a width in the axial direction substantially equal to the axial length of said coil, and a tubular high voltage winding concentric with said low voltage winding having a main section disposed intermediate the axial ends of said coil and energized at all positions of said tap changer switch and also having tap sections at both axial ends of said tubular high voltage winding terminating in taps connected to stationary contacts of said tap changer switch, whereby the mechanical forces resulting from radial leakage flux generated when tap sections are inactive are exerted against opposite ends of and in an axial direction to compress said high voltage winding.

2. In the combination defined by claim 1 wherein said tap sections are at the electrical center of said high voltage winding and the start and finish of said high voltage winding are approximately midway of the axial length of said coil and said main section includes a first portion between the tap sections at one axial end and the start of said high voltage winding and a second portion between the tap sections at the other axial end and the finish of said high voltage winding and said first and second portions are connected through said tap changer switch.

3. In the combination defined by claim 1 wherein said high voltage winding comprises a plurality of axially spaced apart one-turn-per-layer disk coils wound of conductor strip having a width in the axial direction substantially greater than its thickness in the radial direction.

4. In the combination defined by claim 2 wherein the tap sections at one axial end of said high voltage winding are connected to odd-numbered stationary contacts of said tap changer switch and the tap sections at the other axial end of said high voltage winding are connected to even-numbered stationary contacts of said tap changer switch.

5. In the combination defined by claim 2 wherein the tap sections at one end of said high voltage winding are individually connected in parallel with tap sections at the other end of said high voltage winding and said paralleled tap sections are simultaneously activated and inactivated by said tap changer switch, whereby the axial mechanical forces on said primary winding resulting from the radial leakage flux are balanced in all positions of said tap changer switch.

6. In the combination defined by claim 1 wherein said tap sections are in series with said main section and said transformer has a pair of tap changer switches and the tap sections at one axial end of said high voltage winding are connected to the stationary contacts of one of said tap changer switches and the tap sections at the other axial end of said high voltage winding are connected to the stationary contacts of the other tap changer switch and the start and finish line leads of said high voltage winding are respectively connected to the movable contacts of said tap changer switches.

7. In the combination defined by claim 6 wherein said pair of tap changer switches are mechanically ganged and one tap section at each end of said high voltage winding is switched during each actuation of said tap changer switches, whereby the axial mechanical forces on said primary winding resulting from the radial leakage flux are balanced in all tap changer positions.

8. In an electrical distribution transformer having a tap changer switch for changing the transformer voltage ratio, a transformer coil including a radially inner, tubular low voltage winding wound from conductor strip having a width in the axial direction substantially equal to the axial length of said transformer coil, and a radially outer tubular high voltage winding concentric with and axially shorter than said low voltage winding and comprising a plurality of axially spaced apart one-turn-per-layer disk coils wound of conductor strip having a width in the axial direction substantially greater than its thickness in the radial direction and also having such a cross section that adjacent turns interlock to prevent axial movement thereof, said high voltage winding having tap sections at both axial ends thereof terminating in taps connected to stationary contacts of said tap changer switch, the portion of said high voltage winding between said tap sections being energized at all positions of said tap changer switch.

9. In a tap changing transformer having a tap changer switch for changing the transformer voltage ratio, a transformer coil comprising a tubular low voltage winding extending the entire axial length of said coil and a tubular high voltage winding concentric with said low voltage winding having tap sections at both axial ends of said high voltage winding connected at the electrical center of said high voltage winding, the start and finish of said high voltage winding being approximately midway of the axial length of said coil and said high voltage winding having a first portion between said start and the tap sections at one axial end thereof and a second portion between said finish and the tap sections at the other axial end thereof and said first and second portions being electrically connected through said tap changer switch.

10. In the combination defined by claim 9 wherein said low voltage winding is wound from wide conductor sheet and is longer in an axial direction than said high voltage coil.

11. In the combination defined by claim 10 wherein said high voltage winding comprises a plurality of axially spaced apart one-turn-per-layer disk coils wound of conductor strip having a width in the axial direction substantially greater than its thickness in the radial direction.

12. In the combination defined by claim 4 wherein said tap changer switch has a rotatable contact adapted to sequentially bridge between adjacent stationary contacts as it is actuated.

13. In the combination defined by claim 6 wherein the tap sections at said one axial end of said high voltage winding are connected to the odd-numbered stationary contacts of said one tap changer switch and the tap sections at said other axial end of said high voltage winding are connected to the even-numbered contacts of said other tap changer switch.

14. In the combination defined by claim 7 wherein said high voltage winding is axially shorter than said low voltage winding and the corresponding tap sections at both axial ends of said high voltage winding are connected to the same stationary contacts of said pair of tap changer switches and each said tap changer switch has a nonbridging rotatable contact adapted to sequentially engage its stationary contacts.

15. In the combination defined by claim 5 wherein said tap changer switch has a rotatable contact adapted to sequentially bridge adjacent stationary contacts, and at each axial end of said low voltage winding the tap sections connected to odd-numbered stationary contacts of said tap changer switch are isolated from the tap sections connected to the even-numbered contacts thereof and are electrically connected thereto through said bridging rotatable contact.

References Cited

UNITED STATES PATENTS

| | | | |
|---|---|---|---|
| 941,362 | 11/1909 | Dearborn | 323—43.5 XR |
| 1,331,077 | 2/1920 | Moody | 336—223 XR |
| 2,253,165 | 8/1941 | Beymer | 323—43.5 XR |
| 2,840,790 | 6/1958 | Vogel et al. | 336—150 |
| 3,078,411 | 2/1963 | Book | 336—150 XR |
| 3,271,659 | 9/1966 | Philips | 336—70 XR |
| 3,395,335 | 7/1968 | Stoney | 336—150 XR |

FOREIGN PATENTS

| | | |
|---|---|---|
| 15,647 | 1913 | Great Britain. |
| 364,133 | 1932 | Great Britain. |

THOMAS J. KOZMA, Primary Examiner

U.S. Cl. X.R.

336—150